United States Patent [19]

Hirschman

[11] 4,074,461
[45] Feb. 21, 1978

[54] PLANT SUPPORT

[76] Inventor: Abraham Hirschman, 9039 Sligo Creek, Apt. 1003, Silver Spring, Md. 20901

[21] Appl. No.: 783,832

[22] Filed: Apr. 1, 1977

[51] Int. Cl.$^2$ ............................................. A01G 9/02
[52] U.S. Cl. .......................................... 47/70; 47/47; 46/28; 248/165; 248/523
[58] Field of Search ................... 47/44, 45, 47, 41.11, 47/70, 66, 39; 248/163–165, 523; 46/28–29

[56] References Cited

U.S. PATENT DOCUMENTS

| 548,508 | 10/1895 | Bjelland | 47/47 |
| 597,841 | 1/1898 | Dolf | 47/47 |
| 2,083,678 | 6/1937 | Wilson | 47/47 |
| 2,482,979 | 9/1949 | Isakson | 248/165 X |
| 3,026,649 | 3/1962 | Barakauskas | 47/47 |
| 3,076,289 | 2/1963 | Gallo | 47/39 |
| 3,638,814 | 2/1972 | Lowery | 47/45 X |

FOREIGN PATENT DOCUMENTS

| 255,193 | 10/1966 | Austria | 47/47 |
| 473,347 | 1/1915 | France | 47/47 |
| 2,277,524 | 2/1976 | France | 47/47 |
| 18,647 of | 1901 | United Kingdom | 47/47 |

Primary Examiner—Robert E. Bagwill
Attorney, Agent, or Firm—Eric P. Schellin

[57] ABSTRACT

A novel, improved plant support device universally adaptable for holding one or more upright plant-supporting masts substantially vertical in conjunction with a flower pot or other planter receptacle without penetrating the soil or disturbing plant root growth. The support mast can be readily mounted directly to or indirectly in conjunction with the rim portion of the receptacle by means of a pair of generally horizontal cross-disposed mast-traversing-and-supporting rods, each rod separately intersecting the lower base portion of the mast on closely vertically spaced levels, with the ends of the respective horizontal rods slipped through correspondingly provided holes or slots in the upper rim portion of the plant receptacle. Various rim hole and slot arrangements are disclosed to provide for a variety of differing dispositions of one or more of the masts relative to the receptacle's center and/or rim to readily accommodate varying plant stalk/stem locations therein. Provision is made for mounting plural masts which may or may not be relatively interconnected at intermediate and/or upper portions thereof to constitute a variety of plant guiding and supporting trellis structures.

31 Claims, 17 Drawing Figures

PLANT SUPPORT

The present invention relates to a simple novel and useful improvement in potted plant supports.

It is well known that stalks of cultivated plants are often too weak to stand upright without the aid of some external means for support. Although various plant suppports for use with flower pots and the like have been used for a long time, for various reasons many have not been completely satisfactory in achieving the desired objective. Some of the prior art supports are rods, one end of one or more rods being merely indiscriminately inserted into the soil within the plant receptacle. This is considered an unsatisfactory supporting arrangement not only because of the initial shock and damage inflicted on the root system of the plant, but also of subsequently imparted disturbance and damage thereto when the soil-penetrated rod is either inadvertently deflected or intentionally utilized as a partial handle when moving the plants.

Other forms of prior known supports have included various ladder-like or arched trellis-like structures also insertable into the soil or selectively mountable on the interior or exterior of the flower pot. While the latter form is intended to avoid the disadvantage of root disturbance, many have been relatively rigid, non-adjustable devices which also detract aesthetically from the plant.

Accordingly, it is a principal object of the present invention to provide a novelly improved reusable plant support device for association with a flower pot or other similar plant receptacle wherein the unique simple mounting of an ordinary dowel-like mast or rod will not damage the plant in the pot, is sturdy without tendency to slip or wobble, and will efficiently support plants having rather good sized stalks or stems.

A further object is to provide a break-down supporting device of the aforementioned character which is adaptable for assembly and disassembly in a matter of seconds without damage or need for special tools, and which can be reused indefinitely.

Another object is to provide a supporting device according to the preceding objects which may be carefully used as a handle during transporting of the potted plant without imparting injury or significant disturbance to the plant root system.

A further object is to provide a unique plant-supporting device according to the preceding objects which provides for a variety of flexible dispositions of the upright support rod with varying degrees of eccentricity relative to the center or rim of the plant receptacle to accommodate existing growing plants the stalks or trunks of which are not always centrally disposed in the receptacle.

Still another object is to provide such a supporting device which will permit similar mounting of a plurality of such upright dowel-like rods as masts constituting a trellis-like structure where desirable.

Yet another object is to provide a unique variation of the aforesaid novel plant support device which includes the use of ancillary clamp means, including the embodiment of captive or friction-fit universal-joint-like features to compensate for variations in the outward taper of many receptacle rims.

A still further object is to provide additional unique variations in the basic concept of the aforesaid mounting device to facilitate pre-assembly of the mast-mounting means adapted to use a demountable integral or modular-segmented mast therewith for a more compact assembly with a pot without a plant therein or with very young plants not yet needing a very tall support mast.

These and other other objects and advantages, such as providing the support in knock-down kit form with or without a flower pot, will become more apparent from the following detailed description taken in conjunction with the accompanying illustrative drawings wherein:

FIG. 17A–D disclose schematic plan view representations of other various shaped vessels with which the invention may be used.

DETAILED DESCRIPTION

Preliminary to describing the invention in detail, it is to be understood that the invention is preferably but not necessarily limited in its application solely to flower pots or the like, but may have other applications for supports of other types apart from the horticultural field and that it is not limited to the illustrated details of construction and arrangement of parts depicted in the accompanying drawings since the invention and related inventive concepts are capable of still other embodiments and of being practiced in other various ways within the spirit of this disclosure. It is further understood that the phraseology and terminology used throughout is for the purpose of description and not of unnecessary limitation.

Figures 1, 2, 3, 4, 5:
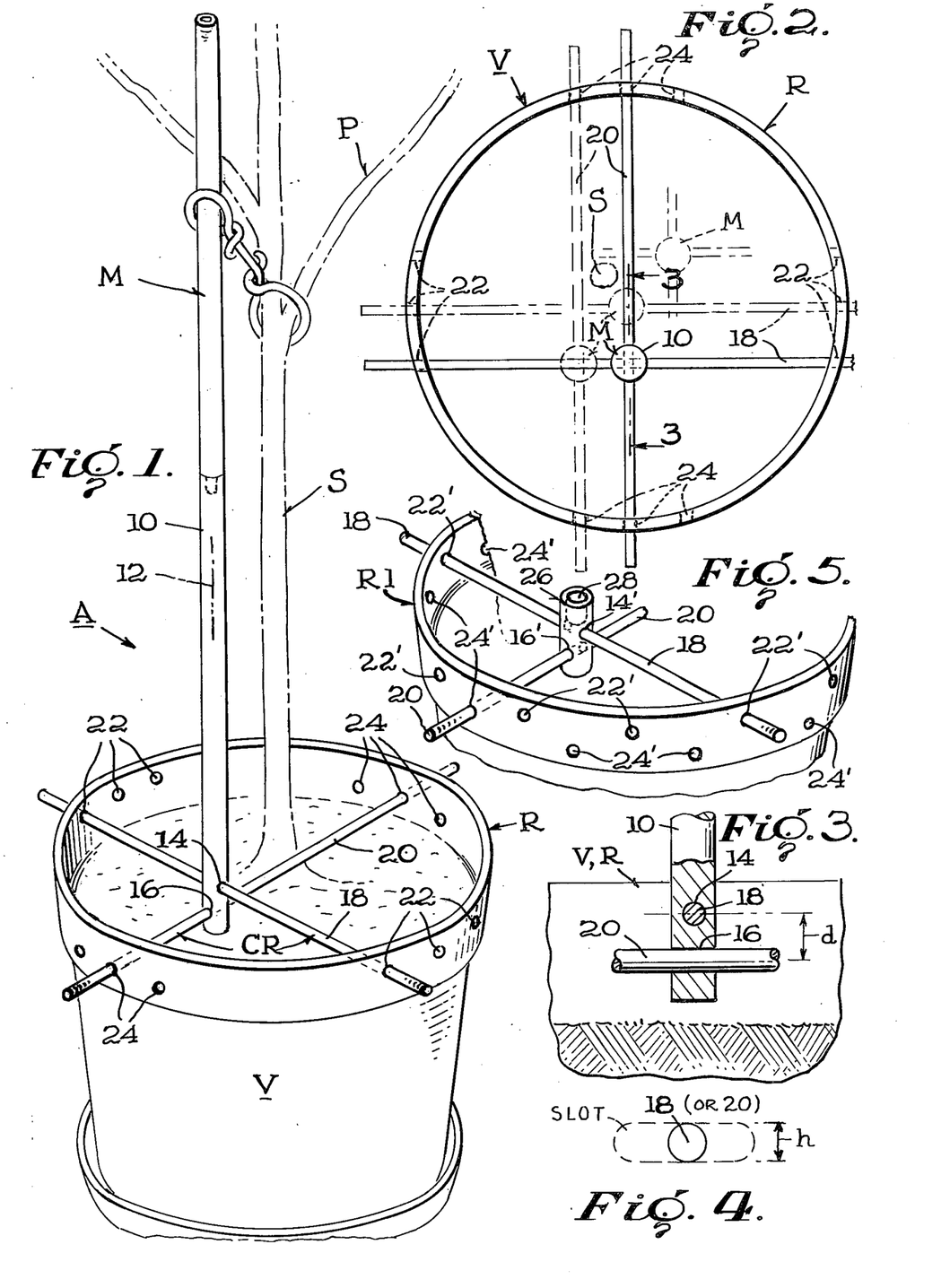
FIG. 1 is a perspective view of one basic embodiment of the novel plant support means of the present invention.
FIG. 2 is a top plan view of the device shown in FIG. 1, and includes phantom-line representations of alternately disposed mountings of the plant-support mast and mast-supporting rods.
FIG. 3 is an enlarged fragmentary detail of the lowermost end of a plant-support mast, and the mast-supporting rods, shown partially in elevation and partially in cross-section.
FIG. 4 is a diagrammatic detail of a slot for mounting one of the mast-supporting rods.
FIG. 5 is a fragmentary perspective view of an alternate embodiment of the mast-mounting rods in conjunction with an alternate pattern of rim-mounting apertures.

Referring now to FIGS. 1 and 2 of the drawings, there is shown one basic exemplary form of the upright plant support means of this invention, the assembly of which is generally designated A depicted in supportive association with a plant P in vessel V. The vessel has an apertured rim R to receive the assembly of components including a plant-supporting mast M and its related crossed rods CR. The stalk or stem of the plant is designated generally S.

More specifically the plant-supporting mast M comprises an elongated rod 10 having a longitudinal axis 12 and adapted for disposition with the axis in a generally vertical mannner in conjunction with the plant-growing vessel V. The lowermost portion of rod 10 is provided closely adjacent its free end with a pair of generally cross-disposed apertures 14 and 16, said apertures 14 and 16 each formed through the mast generally transverse to its length in relatively close but axially spaced relation (distance $d$ in FIG. 3) and at generally right angles to each other. The vertical or axial distance $d$ between the apertures 14 and 16 may vary somewhat depending upon the relative size of the stock materials being used. However, a distance of from about three-eighths to one-half inch has been found to work very well in successful practice of the invention.

Adapted for cooperative mounting in apertures 14 and 16 are a pair of elongated, mast-supporting rods 18 and 20. The pair of rods 18 and 20, like the corresponding pair of apertures 14 and 16 which they slidably traverse, preferably are essentially of the same cross-sectional size.

The masts M may be fabricated of any suitable rigid material such as wood, metal or plastic-like material. Standard maple wood dowel rods have been found to be very acceptable as masts. It is also understood that the masts may be of square or other than circular cross-section, and the transverse cross-oriented aperture may be disposed other than through the exact center, under some circumstances. Either bamboo skewers or fine metal rods, such as brazing and/or welding rods or other suitable wire of about one-sixteenth inch diameter or so, have worked very successfully as the mast-stabilizing rods 18 and 20, on a variety of the more common household type flower pot or plant vessels. It is well apparent that the relative sizes of the mast and cross-rods will vary depending upon the size of the plants and plant-containing vessels.

The vessel's rim R is appropriately apertured with at least one pair of correspondingly opposed apertures for each of the rods 18 and 20. In FIGS. 1 and 2, however, there are shown generally diametrically opposed preferably coplanar sets of three holes each, designated 22, for preferably close-fitting but slidable receipt of rod 18. Similarly, there are shown opposed, coplanar sets of three holes each, designated 24, also for closefitting but preferably slidable receipt of rod 20, with holes 24 respectively spaced on a plane lower than that for the holes 22. The relative spacing of the aperture planes will correspond to the axial, vertical spacing of the centers of apertures 14 and 16. The peripheral spacing of apertures of the respective sets of apertures 22 and 24 may be but need not necessarily be equal. Any artibrary plurality of holes may be used for each set, with either a center-most opposed pair, or generally center-most opposed pairs straddling imaginary cross diameters.

In the illustrated embodiment of FIGS. 1 and 2, the center-most opposed pairs of apertures of the apertures of the respective sets are shown on generally crossed diameters. Thus, the pairs of opposed holes which are laterally adjacent the center ones are oriented so that when they are utilized to receive rods 18 and 20, they would be chordally disposed. This is particularly the case where the apertures are essentially circular rather than being slightly enlarged in the lateral direction only.

In FIG. 2, a few of the plurality of alternate relative dispositions of the mast and crossed rods are shown in phantom or broken lines.

Proceeding to the modified embodiment shown fragmentarily in FIG. 5, the rim R1 is provided with upper and lower peripheral rows of substantially uniformly spaced and generally radially formed apertures 22' and 24' corresponding to the apertures 22 and 24 in the first-described embodiment of FIGS. 1 and 2. As mentioned hereinabove, by slightly enlarging or elongating the apertures 22, 22' and 24, 24' in the lateral direction, while maintaining a snug or press fit in the vertical dimension, a much greater variety of chordal rod arrangements is made possible.

It is understood that the same type rods 18 and 20 are preferably used, and they will traverse apertures like 14 and 16 of an integral mast M as in FIG. 1, or those of a modified mast-receiving socket 26 having cross-disposed spaced apertures 14' and 16' corresponding to the apertures 14 and 16 in FIG. 1. The mast-receiving socket 26 is also pre-drilled or otherwise suitably formed with a mast-insertable recess 28. Preferably the mast is positively connected within the socket recess 28 by any suitable means such as threads, cotter-type pin, snap ring or annular collar. If only a slight friction fit were utilized, it is conceivable that in instances where the plant is tied rather securely to the mast, in due time the growth of the plant may cause the mast to be drawn upwardly out of the socket.

It is contemplated that plant-supporting masts of varying length or height may be selectively inserted into the recess 28 depending upon the height of the plant involved. The masts M may be also made of modular relatively short lengths with cooperative means on opposite ends to suitably accommodate selectively adding of short lengths thereof as needed.

Figures 6, 7:
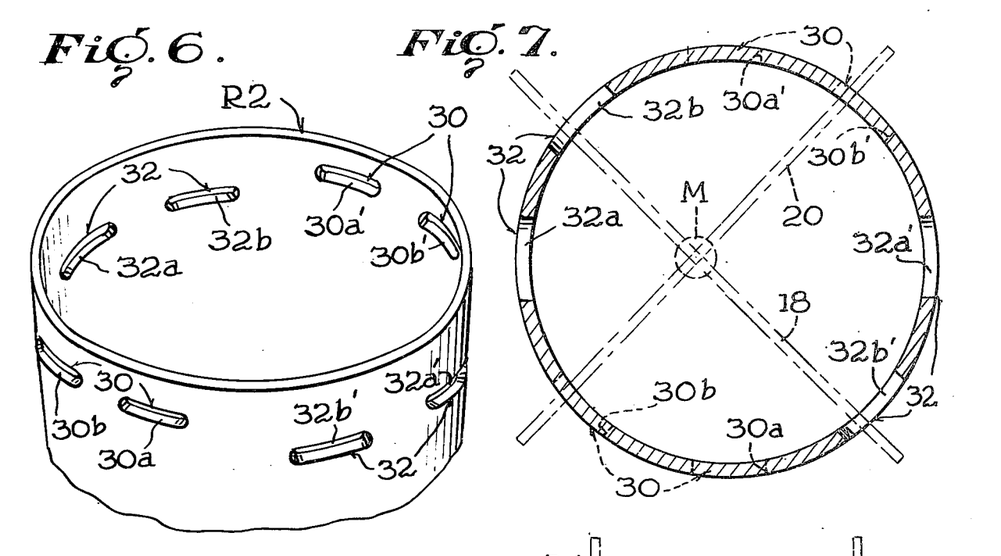
FIG. 6 is a perspective view of a fragmentary portion of a plant receptacle showing a modified arrangement of rim-mounting slots.
FIG. 7 is a horizontal cross-sectional view of the embodiment of FIG. 6, taken through one set of the slots.

FIGS. 6 and 7 are representative views of a modified arrangement of the rim apertures utilizing horizontally elongated slots to provide for a greater selectively variable range of mast positions. There are shown two coplanar sets of upper slots 30,30 in generally opposed peripheral portions of the rim R2, and also two coplanar sets of slightly lower spaced slots 32, 32 provided on other generally opposed peripheral portions of the rim. The respective sets of slots 30 and 32 correspond generally to the respective sets of apertures 22 and 24 in FIGS. 1 and 2. As seen better in FIG. 7, all eight of the slots are arbitrarily depicted of equal horizontal length with equal spacing between the collective sets of slots and which may or may not correspond approximately to the slot length. The arbitrarily equal slot length and the intermediate spaces also corresponding to the slot length are apparent only from an overall plan view as per FIG. 7. That is, while the medial spacing between adjacent slots of the respective pairs of slots 30,30 is shown by projection to be equal to the slot length, it is apparent that because they are on a different plane from the pairs of slots 32,32, then the other remaining peripheral spacing between pairs of coplanar slots 30,30 is considerably greater. The same is true of the lower level plane slots 32,32. Of the pairs of slots 30,30, slots 30a, 30a' and 30b,30b', respectively, are further preferably diametrically opposed, as are slots 32a,32a', and 32b,32b' of the lower pairs of slots 32,32, also better seen in FIG. 7.

It is understood that the spacing and slot arrangements can be such that the generally uniform pairs of slots with whatever selected amount of spacing therebetween, will fit an even number of times into the given peripheral distance of generally any sized pot or receptable. As intimated above, the slots and spaces therebetween need not be equal, when viewed in top plan view. It is also understood that the vertical distance of the slot is just barely larger than the diameter or vertical height of the rod, in order to ultimately provide a preferred degree of friction fit tightness of the rods therein.

A mast and a pair of mast-supporting rods are shown in broken lines in FIG. 7, with rim slots of this embodiment being adapted to receive the rods 18 and 20 so as to produce a selective variety of diametrical, near diametrical, or off-diametrical dispositions of a mast M.

With regard to the relative thickness or height $h$ (FIG. 4) of the slots 30 and 32, in instances where the flower pot is fabricated of a somewhat pliable or slightly yieldable material, they are of a dimension slightly less than the diameter of the mast-stabilizing rods 16 and 18. This will provide a snug fit of the respective rods, when forced in the slots, thus assuring a relatively stable and not-easily-changeable mounting of the mast relative to the plant stalk.

For pots made of rigid non-flexible or non-yieldable material, the height of the slot will be essentially equal to or just slightly greater than the thickness of the rods so as to provide a requisite snug fit thereof.

Figures 8, 9, 10, 11, 12:
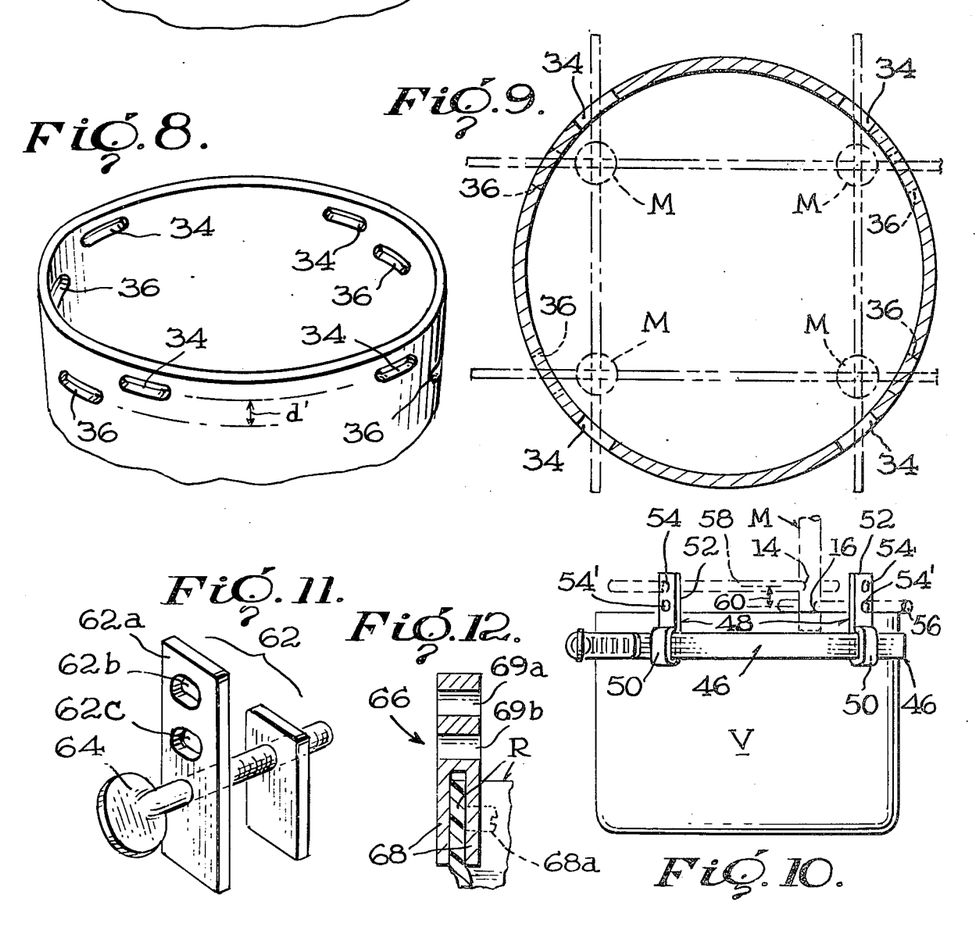
FIGS. 8 and 9, respectively, are perspective and cross-sectional views similar to FIGS. 6 and 7, respectively, but showing a further modified arrangement of mast-supporting slots adaptable particularly for chordal disposition of two pairs of mast-supporting rods in association with from two to four masts.
FIG. 10 is a reduced scale elevational view of a modified mast-supporting device embodying a strap-on clamping device.
FIG. 11 is a perspective view of an apertured thumb-screw-type clamp device, usable in pairs in generally diametrically or chordal opposed relation on a rim of a flower/plant pot.
FIG. 12 is a vertical cross-sectional detail view of a friction-fit apertured clamp device of modified form adaptable for friction-fit on the rim of a plant receptacle.

FIGS. 8 and 9 illustrate a further embodiment of using bilevel pairs of slots as apertures arranged for the selectively adjustable disposition of the mast-mounting rods in smaller chord-like relation to the periphery of the plant vessel. This arrangement enables the mounting of from two to four masts in the general manner depicted also in FIG. 16. In FIGS. 8 and 9, there are four widely spaced upper coplanar slots 34 of much lesser horizontal extent than slots 30 to 32 in the embodiment of FIGS. 6 and 7. There are also four widely spaced lower coplanar slots 36, with the vertical distance $d'$ (FIG. 8) between the planes of the slots corresponding to the axial distance $d$ between the cross-disposed apertures 16 and 18 in the lower end of a mast M.

It can be readily seen in FIGS. 8 and 9 that this slot arrangement provides four more closely disposed pairs of non-coplanar slots 34,36 whereby the bamboo skewers, or other rods corresponding to rods 18 and 20 which serve to stabilize the mast, are readily cross-inserted in the vertically spaced cross-oriented apertures of the mast. In this manner one or two pairs of the masts can be readily mounted to form a trellis-like support for a plant or group of plants.

Figure 16:
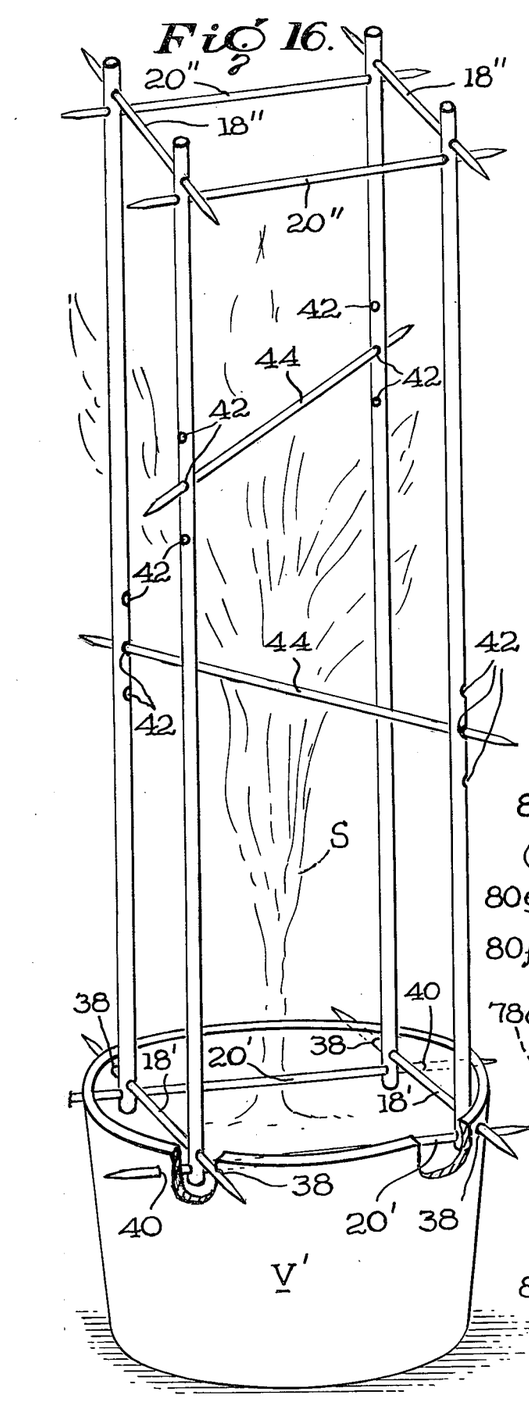
FIG. 16 is a perspective view showing an assembly of four plant-support masts near the peripheral rim of the plant receptacle to form one preferred form of trellis-like structure according to the principals of the present invention.

In this latter regard, FIG. 16 is illustrative of a planter vessel V' having four extra tall masts mounted thereon by means of suitable rods or bamboo skewers 18' and 20' disposed through appropriately disposed sets of non-slotted holes 38 and 40. Parts of the vessel rim are broken away fragmentarily to more clearly see the assembly of the vertically-spaced, cross-disposed support rods.

The invention also includes provision preferably for like interconnection of the upper ends of the masts to selectively stabilize one or more pairs thereof. In this regard, additional standardized rods or skewers 18" and 20" are readily insertable in the correspondingly vertically spaced cross-oriented apertures corresponding to apertures 14 and 16.

Alternatively, or additionally to the stabilizing rods 18" and 20", the masts of FIG. 16 are preferably provided with a plurality of pass-through apertures 42 in vertically spaced relation in intermediate portions of the masts. These holes 42 are disposed or oriented at approximately 45° relative to the axis of the other generally right-angularly disposed holes near the opposite ends. The 45° or other suitable angular disposition thus enables diagonal cross tie mounting of supplemental tie rods 44 (FIG. 16). The tie rods provide a rigidity to the trellis-like structure and provide added support for climbing type plants.

Referring next to FIG. 10, as an alternative to the foregoing disclosed supports, for plant receptacles which do not readily lend themselves to being provided with apertures as in the aforedescribed manner, the invention contemplates the use of a strap-like peripheral attachment or hose-clamp-like collar 46 with suitable means for adjusting it for mounting on various diameter flower pots. Clamping collar 46 further includes two pairs of upstanding brackets also preferably adjustably attached in any suitable manner to peripherally spaced portions of the band-like collar 46.

An example of such an arrangement includes a plurality of brackets 48 each of which includes at the lower end a flattened loop 50 for slidable adjustment on the strap-like collar 46. The loop 50 may be readily fabricated from a continuation of the bracket body where made of relatively thin but rigid sheet metal, moldable plastic or other suitable material which will serve the basic purpose in the following manner. Brackets 48, at their upper portions 52 above the loops 50, are provided with an upper aperture 54 and a lower aperture 54'. The vertical distance 60 between the holes correspond to the offset of the mast-stabilizing-and-supporting rods 56 and 58, which are used to mount the mast in the same manner as described in the previous embodiments. The belt-like loops 50 of the brackets enable the brackets to be slidably adjusted along the collar band, when the band is in a loosened condition. After placing the brackets in the desired peripheral locations the clamping collar is again tightened around the rim of the pot, thus pinching the brackets via their inside walls of the loops 50, against the rim to preclude undesirable shifting thereof. Thus a simplified manner of adjustment has been exemplified without need of attachment screws, rivets, adjustment holes or slots in the collar. The mast is thus mountable in a variety of centered or eccentric dispositions relative to the plant vessel rim, generally as described relative to the first-described embodiments.

As an alternative to using a band or strap-like clamp attachment encircling the vessel, various clamping means have been evolved to attach onto the free upstanding rim of the plant vessel. FIG. 11 depicts a two-part clamp 62 held adjustably together by a common thumb screw 64. The longer of the two parts 62a includes an upstanding portion with preferably a pair of spaced apart apertures 62b and 62c so as to receive the mast-mounting rods such as 18 and 20 (not shown in FIG. 11). While the apertures may be essentially circular for some specific applications, by use of apertures of laterally elongated form, as shown, a wider variety of chordally disposed rods may be provided. It is understood that where the term aperture or hole is used anywhere in this application, it may embody the laterally slotted form to provide the broader range of mounting the mast-supporting rods. The slots are a more preferred form, with the circular holes being a less-preferred specific variation. Thus two pairs of the clamps can be selectively mounted in predeterminable and selectively changeable locations on opposite sides of a plant vessel rim, with one pair offset about 90° from the other pair to provide the aforesaid type of mounting of a support mast.

FIG. 12 is illustrative of one of a variety of slip-on clamps 66 having bifurcated legs 68 spaced apart a predeterminable distance for accommodating various predeterminable thickness plant vessel rims R. The upper part of the clamp is provided with preferably a pair of vertically spaced apertures 69a and 69b to accommodate either of the mast-mounting rods 18 or 20 in the manner already described. Where there may be some concern over possible inadequate slip-fit tightness of the bifurcated leg portion upon the rim, such as when one given size clamp may need to be used on a thinner rim receptacle, it is contemplated that an optional conventional set screw 68a (or thumb screw) may be utilized as shown in phantom lines on the inside leg of FIG. 12.

Figure 13:
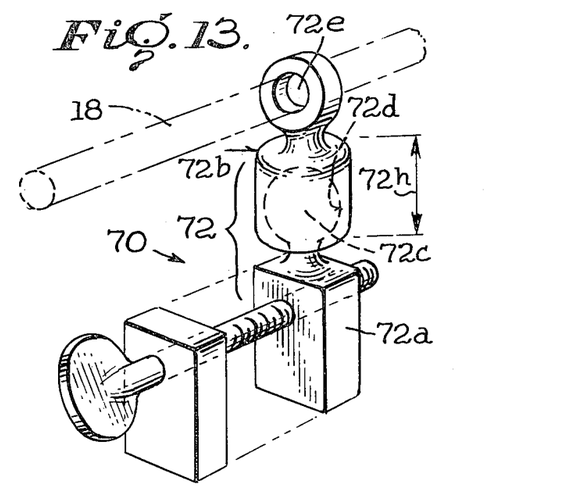
FIGS. 13, 14 and 15 are further perspective detailed views of three alternate contemplated rim-attaching brackets embodying friction-fit-changeable universal-type fittings to facilitate correct mounting of the unique plant-supporting mast and cross-rod assembly in conjunction with receptacles having varying degrees of outward taper of the rim.

FIG. 13 is illustrative of a modified thumb-screw-type clamp 70, similar in some respects to the clamp of FIG. 11. However, the clamp 70 includes one composite clamping leg 72. Composite leg 72 includes lower part 72a and upper apertured part 72b each of which further include ball and socket elements 72c and 72d operable in a relatively tight friction-fit manner. The hole 72e is sized to receive one of the mast-mounting rods 18 (or 20) as in the foregoing manner when pairs of the clamps are appropriately affixed onto the vessel's rim. A complemental pair of clamps having greater body height 72h is used with the first described pair. The difference in body height is only that to accommodate the vertical offset of the mast-mounting rods. The ball and socket elements may be fabricated of a polyethylene material and readily assembled and disassembled by hand press fit.

Figures 14, 15, 17:
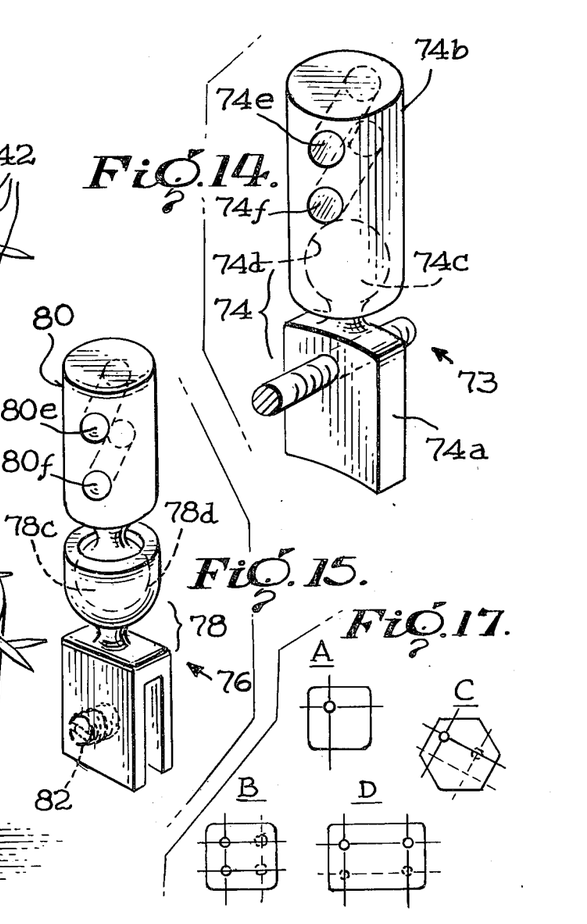

In lieu of providing two different height clamps as just described, a further modification of the clamp, designated 73, is shown in FIG. 14. Clamp 73 includes a composite sub-assembly portion 74 including a lower part 74a and an upper apertured part 74b. The upper part 74b can be of uniform height but provided with two apertures 74e and 74f spaced apart corresponding to the offset of the mast-mounting rods as described in the foregoing. Composite part 74 also embodies a basic universal joint type having ball 74c and socket 74d which require a fair amount of effort to vary their friction-fit relationship.

It is apparent that this universal character not only enables the upper parts of the clamp to be rotatively adjusted on its vertical axis to align rod-receiving apertures of peripherally spaced clamps for proper alignment, but also permits adjustment of the upper parts of such clamps to tilt to provide substantially horizontal alignment of the rod-receiving apertures and thereby compensate for varying degrees of outward taper of rims of various planters or flower pots.

The third illustrative clamp utilizing the exemplary basic universal joint concept is designated 76 and shown in FIG. 15. Clamp 76 is of the rim slip-on type via its bifurcated lower body portion 78. The upper portion is designated 80, and the respective parts 78 and 80 include the complemental co-acting universal joint forming portions 78c and 78d. The respective ball and socket features of the various clamps, when provided respectively on the same relative parts of the composite bracket leg, may then be readily interchangeable with one another, if necessary or desirable to use on different types of clamps. Upper part 80 at its upper half portion is provided with a parallel pair of rod-receivable apertures 80e and 80f, which in this instance are spaced vertically apart a distance corresponding to the offset distance d mentioned in conjuction with FIG. 3. This provides a selective choice of which of the rods is to be the uppermost or lowermost one. A set screw 82 shown in one of the legs of the lower part is an optional feature to provide a positive means of attachment of the clamp to a vessel rim.

Common to all embodiments, the preformed holes in such mast ends are such as to provide a close-fitting slidable fit of the mast-mounting rods, the latter of which should be of fairly uniform diameter or cross-section. In this manner, there is formed a very sturdy plant support by the irregularly offset intersection and interaction of three generally perpendicular rods — the mast and two mast-stabilizing rods. The rods have some inherent flexibility and by the unique assembly provide essentially a floating type of mounting. The two crossed over near-intersecting horizontal rods generate two different oriented resilient constraints to assure a stabilized mounting of the mast. The effect is to both fix the location of the mast (through the interaction of the projections of the rods) and to fix the orientation of the mast basically perpendicular to both rods, and thus to immobilize it relative to the pot to which the rods are constrained.

By this novel arrangement of effectively immobilizing the mast, the latter becomes an extension of the pot to which the upper part of a plant can be tied or wired. The stress of an unbalanced plant against the mast is communicated not to the soil which yields under light stress, but to the pot which is rigid. An appropriate degree of flexibility is provided by the elastic properties of the mast and rods. Thus when a growing plant begins to lean and impart a deflection against the spring-like mounting, a restoring force proportional to the deflection is generated by the unique plant-support assembly herein and readily serves to restore the growth more upright. Each of the two mast-supporting rods, disposed in the vertically spaced cross-oriented fashion, serve to transfix the mast thus supporting it in a uniquely stable manner which in turn is transferred to the associated plant. The cross-oriented apertures are drilled or otherwise suitably formed with each preferably being perpendicular to the axis of the dowel or mast and also to each other. Where small tolerances exist, the inherent flexibility of the metal or bamboo mounting rods enables the assembly to be readily completed.

The unique plant support sub-assembly can be marketed either in conjunction with flower pots having performed rodreceiving apertures or slots, or it can be distributed in kit form without a pot as a separate combination kit for ready use with a variety of pots and planters.

Most planters or similar receptacles adapted for plantgrowing are of a material which will readily lend itself to the formation of the requisite holes or slots. Even a heated end of a wire will readily press through acrylic and other type plastic receptacles, if a drill is not readily available. The clay and ceramic pots as well as those of plastic are to be preferably produced with the performed holes and/or slots.

It is readily apparent that all of the objectives have been achieved by this novel invention whereby one or more plant-supporting masts and attendant axially spaced transfixing cross-oriented rods are mountable in a variety of selective manners. The invention lends itself to association with various shaped pots and planters, as further illustrated in FIG. 17, parts A–D.

It is also readily apparent that numerous changes in shape, size and materials may be made without departing from the spirit and scope of the invention as defined in the following appended claims.

What is claimed is:

1. Upright plant-support means for use with peripheral rim portions of flower pots and other plant-growing vessels, comprising:
    (a) a vessel for growing flowers and plants, said vessel having an upstanding peripheral rim;
    (b) mast means including an elongated mast having a longitudinal axis and adaptable for disposition with said axis in a generally vertical manner in conjunction with the plant-growing vessel;
    (c) said mast means including a lowermost free end portion provided closely adjacent thereto with a pair of cross-disposed apertures each formed to pass generally through the axis of said mast means generally transverse to its length and in relatively close but axially spaced relation at generally right angles to each other;
    (d) a pair of elongated, mast-supported rods for respectively traversing said cross-disposed apertures at said lowermost end portion of said mast means and in close-fitting slidable relation, for stabilizing said mast in vertically supported relation to said rods;
    (e) mounting means for respectively interconnecting predeterminable rim portions of said vessel with generally end portions of said cross-oriented rods, for affixing the mast and cross-rod assembly to said plant-growing vessel with said mast in the generally vertical position; and
    (f) said pair of rods being in assembly with both said mast means and said vessel rim, and respectively being of at least vessel-rim-chord-spanning length generally horizontally spanning across and operatively mounting in a cross-disposed manner with the selectively predeterminable circumferentially spaced rim portions of said vessel.

2. Plant support means as defined in claim 1, wherein said vessel rim is provided with a plurality of rod-receivable apertures including a plurality of pairs of substantially diametrically aligned apertures in predetermined peripherally spaced rim portions, with at least one certain opposed pair disposed at predetermined slightly vertically spaced relation to at least another certain pair to constitute part of said mounting means, and said apertures being of a size and disposed for selective closely slidable fit with said cross-disposed rods.

3. Plant support means as identified in claim 2, wherein said apertures in said vessel rim include first and second sets of which each set comprises a plurality of generally diametrically opposed coplanar apertures; the second set being offset both vertically from the first set by a distance corresponding to the axial distance between the cross-disposed apertures in said mast lower end portion, and also offset circumferentially generally 90° from said first set to operably receive said cross-disposed rods.

4. Plant support means as defined in claim 3, wherein corresponding apertures of each set of said apertures are essentially diametrically opposed, and with the spacing between sets of the apertures and the number of sets being such that an equal number of sets of apertures will fit into the rim periphery an even number of times.

5. Plant support means as defined in claim 3, wherein said apertures in said vessel rim include four pairs of generally diametrically opposed horizontal slot-form apertures comprising a first and second set of two pairs each, the two pairs of apertures of each set respectively being coplanarly disposed in crossed generally diametrically opposed portions of said rim.

6. Plant support means as defined in claim 5, wherein said slot-form apertures of both sets are of uniform horizontal length, and the collective total number of slots of both sets are collectively generally equally spaced circumferentially relative to the collective total thereof.

7. Plant support means as defined in claim 2, wherein said vessel has a free upstanding rim edge, and wherein said rim-disposed apertures comprise first and second coplanar sets of peripherally spaced rod-receivable holes of a size to slidably receive mast-supporting rods therethrough; said first set of holes being disposed closest to the free edge of the upstanding rim and in generally equally spaced relation around the periphery of the rim; said second set of coplanar holes disposed with the plane thereof spaced a vertical distance downwardly from the plane of the first set of holes, and the vertical distance between the planes of the first and second sets corresponding to the axial distance between said cross-disposed apertures in the lower end portion of said mast means.

8. Plant support means as defined in claim 7, wherein said apertures of said first and second sets are staggered circumferentially relative to one another so that none of the apertures of the first set are directly above the apertures of the second set.

9. Plant support means as defined in claim 2, wherein said rim-disposed apertures are of elongated horizontal slot form having a slot height essentially equal to the thickness of each cross-disposed rod so as to maintain a friction-fit of the rods in said slots irrespective of the relative position in the slots.

10. Plant support means as defined in claim 9, wherein there are provided a plurality of sets of generally diametrically opposed coplanar horizontal slot form apertures, said slot form apertures being of a length and number, and the spacing between sets thereof being such that an equal number of sets will fit into the rim periphery an even number of times.

11. Plant support means as defined in claim 2, wherein said vertically spaced apertures constitute respective first and second sets, each set being constituted by two pairs of horizontally elongated slots; one slot from each of said vertically spaced set being paired together in a slight circumferentially offset step-like manner to form four generally corresponding step-like pairs of slotted apertures disposed in generally peripherally equal distant relationship; and said step-like pairs arranged such that any two adjacent pairs thereof are always oppositely oriented to facilitate proper chordal mounting of the mast-supporting rods through the respective step-like slots.

12. Plant support means as defined in claim 1, wherein said mounting means include intermediary clamp means mountable on said vessel rim, said clamp means comprising a plurality of rod-receiving-and-holding elements in conjunction with the selectively predeterminable circumferentially spaced rim portions of said vessel, and said rods having respective end portions which are cooperatively held by said element to maintain said mast in erect generally vertical relation to said vessel.

13. Plant support means as defined in claim 12, wherein said clamp means embodies an expansible-contractible band type strap with means to maintain it in circumferentially embracing relation with an upper general rim portion of the plant vessel, and said plurality of rod-receiving-and-holding elements are adjustably affixed to predetermined circumferentially spaced portions of said band type strap.

14. Plant support means as defined in claim 12, wherein each of said rod-receiving-and-holding elements include a pair of friction-fit universally joined members of which one of said members includes an opening oriented for receiving one of said rods therein in generally horizontal disposition, said universally joined members providing for selective universal adjustment to facilitate a substantially vertical disposition of said mast notwithstanding variations in taper of a peripheral rim portion of the vessel with which it is assembled.

15. Plant support means as defined in claim 14, wherein said universally joined friction-fit members are of ball and socket form.

16. Plant support means as defined in claim 1, wherein said lowermost free end portion of said mast means includes a relatively short elongated mast-receiving body having an upper end and lower end coaxial with said mast, said relatively short elongated body including an axial recess in its upper end to receive and retain a lowermost end of said mast therein, and the lower end of said relatively short elongated body being provided with said cross-disposed apertures.

17. Upright plant-support means for use with peripheral apertured rim portions of flower pots and other plant-growing vessels, comprising the subcombination of:
(a) an elongated mast having a longitudinal axis, adaptable for disposition with said axis in a generally vertical manner in conjunction with a plant-growing vessel;
(b) said mast having a lowermost end provided adjacent thereto with a pair of cross-disposed apertures each formed through said mast transverse to its length in relatively close but axially spaced relation at generally right angles to each other;
(c) a pair of elongated, mast-supporting rods for respectively traversing said cross-disposed apertures of said mast in close-fitting slidable relation, for stabilizing said mast in vertically supported relation to said rods; and
(d) said pair of rods adapted for assembly both with said mast and vessel and respectively being of at least vessel-rim-chord-spanning length for generally horizontally spanning across and operatively friction-fit mounting in alignable apertures formed in selectively predeterminable rim portions of said vessel including pairs in both diametrically and nondiametrically aligned disposition.

18. Plant support means as defined in claim 17, wherein said pairs of rods are of a length greater than a diameter of the plant-growing vessel to facilitate disposition in generally diametrically disposed apertures.

19. For use in operative combination with peripheral rim portions of plant-growing pots and vessels, said rim portions being generally vertically extending with said apertures extending transversely therethrough, the subcombination of a readily mountable and demountable support device for maintaining plants and flowers in an upright condition, said subcombination device comprising:
(a) an upright standard-like mast having a lower free end portion;
(b) mast-stabilizing means comprising a pair of generally horizontally disposed, cross-oriented rods respectively traversing said lower free end portion of said mast through apertures disposed in slightly vertically spaced apart, correspondingly cross-oriented relation, to thereby fixedly orient said mast in substantially perpendicular relation to said cross-oriented rods; and
(c) cooperative mounting means embodied respectively with said cross-oriented rods including separate clamping means for mounting the rods and mast on a vessel's rim; said clamping means including a plurality of clamp bodies each having a rod-receiving aperture; said clamp bodies being selectively orientable on said vessel rim to provide rod-receiving apertures so as to receive said rods therethrough in the relative manner dictated by the aforesaid cross-oriented, vertically spaced rods.

20. The device as defined in claim 19, wherein each of said clamp bodies include a composite body member comprising complemental universal type fittings, one of said fittings being an uppermost one which is provided with said rod-receiving aperture.

21. Plant support means for use with peripheral apertured rim portions of flower pots and other plant-growing vessels said rim portions being generally vertically extending with said apertures extending transversely therethrough, comprising the subcombination of a trellis system including:
(a) a plurality of elongated masts having upper and lowermost ends, and adaptable for disposition with a longitudinal axis of each in a generally vertical upright manner in conjunction with a plant-growing vessel;
(b) said plurality of masts including a pair of masts each having at least their lowermost ends provided adjacent thereto with a pair of cross-disposed apertures each formed through each of said masts transverse to its longitudinal length in relatively close but axially spaced relation and at generally right angles to each other,
(c) pairs of elongated, mast-supporting rods for respectively traversing said cross-disposed apertures of said mast in close-fitting relation, for stabilizing said masts transversely to said rods;

(d) said pairs of rods adapted for assembly with both said masts and vessel, said rods respectively being of at least vessel-rim-chord-spanning length;

(e) whereby pairs of said masts are adaptable to be maintained as trellis-like members in their generally vertical and generally parallel manner in conjunction with a plant vessel and wherein said rim-disposed apertures are of elongated horizontal slot form having a slot height essentially equal to the thickness of each cross-disposed rod so as to maintain a friction-fit of the rods in said slot irrespective of the relative position in the slots.

22. Plant support means as defined in claim 21, wherein one rod of two transversely adjacent pairs of mast-supporting rods is common to each pair and traverses both associated masts, and the other rods of said pairs are non-common rods disposed in generally horizontal parallel relation to each other.

23. Plant support means as defined in claim 22, wherein said plurality of masts include two pairs of substantially identical masts, and including a further mast-supporting rod substantially identical to those of said first-mentioned pairs of elongated rods; said further rod adapted for commonly transversing a second pair of masts via a pair of correspondingly aligned apertures of said cross-disposed apertures of the second pair of masts; each of said non-common rods having free end portions remote from their adaptable intersection with the respective masts of the first-mentioned pair of masts; and each free end portion of said non-common rods intersecting the respective other aperture of the respective cross-disposed apertures of each of said second pair of masts, whereby there are four elongated mast-stabilizing rods all adapted for chordal disposition relative to said vessel peripheral rim to mount said two pairs of masts vertically and adjacently inward of said vessel peripheral rim.

24. Plant support means as defined in claim 23, wherein said masts have intermediate and upper end portions, and rod means adaptable for selectively interjoining intermediate and upper end portions to provide supplemental lateral stability and additional trellis-like cross-supports to said plant-support masts.

25. Plant support means as defined in claim 23, wherein each of said masts have uppermost terminal end portions, each of which is also provided with a pair of cross-disposed apertures transverse to the axial length similar to those aforedescribed in relation to the lowermost end of said masts, to thereby facilitate generally rectangular interjoining of said upper end portions of said masts by other elongated rods similar to those for supporting said masts at the lowermost ends.

26. Plant support means as defined in claim 22; wherein said masts have intermediate and upper end portions, and rod means adaptable for interjoining said upper end portions of said masts.

27. A flower and plant-supporting trellis system adaptable for ready assembly and mounting in operative conjunction with peripheral rim portions of plant-growing pots and vessels, said trellis system comprising:

(a) a plant vessel having an upstanding peripheral rim provided with plural apertures of elongated horizontal slot form having a slot height essentially equal to the thickness of each cross-disposed rod so as to maintain a friction-fit of the rods in said slots irrespective of the relative position in the slots, in predeterminable location and adapted to house a plant therein;

(b) at least one pair of elongated masts each having a longitudinal axis and adaptable for generally vertical parallel manner in conjunction with circumferential spaced rim portions of said vessel;

(c) said masts each having a lowermost end provided with a pair of cross-disposed apertures each formed through said mast transverse to its axial length in close but axially spaced relation and at generally right angles to each other;

(d) a pair of elongated rods respectively traversing each of said masts through said cross-disposed apertures in close-fitting slidable relationship to stabilize each mast relative to its said pair of rods;

(e) the rods of said pairs of rods each being of a length to horizontally span selectively predeterminable chord portions of a vessel's rim, and rod end portions engageable with a lightly slidable fit in apertures provided in corresponding relation in said vessel rim;

(f) whereby said pair of masts are adaptable to be maintained as trellis-like members in a generally vertical and generally parallel manner in conjunction with said plant vessel.

28. The trellis system of claim 27, wherein one rod of two transversely adjacent pairs of mast-supporting rods is common to each pair and traverses both associated masts, and the other rods of said pairs are non-common rods disposed in generally horizontal parallel relation to each other.

29. The trellis system of claim 28, wherein said masts include two pairs of substantially identical masts, and including a further mast-supporting rod substantially identical to those of said first-mentioned pairs of elongated rods; said further rod adapted for commonly transversing a second pair of masts via a pair of correspondingly aligned apertures of said cross-disposed apertures of the second pair of masts; each of said non-common rods having free end portions remote from their adaptable intersection with the respective masts of the first-mentioned pair of masts; and each free end portion of said non-common rods intersecting the respective other aperture of the respective cross-disposed apertures of each of said second pair of masts, whereby there are four elongated mast-stabilizing rods all adapted for chordal disposition relative to said vessel peripheral rim to mount said two pairs of masts vertically and adjacently inward of said vessel peripheral rim.

30. The trellis of claim 27, wherein said apertures are of elongated horizontal slot form having a slot height relative to the thickness of each cross-disposed rod so as to maintain a friction-fit of the rods in said slots irrespective of the relative position in the slots.

31. The trellis system of claim 27, wherein said masts and mast-stabilizing rods are modular in character to more readily facilitate interchangeability of components and plural installations.

* * * * *